US008286363B1

(12) United States Patent
Martinez

(10) Patent No.: US 8,286,363 B1
(45) Date of Patent: Oct. 16, 2012

(54) SCREW MOUNT PLACEMENT DEVICE

(76) Inventor: Richard J Martinez, Algonquin, IL (US)

( * ) Notice: Subject to any disclaimer, the term of this patent is extended or adjusted under 35 U.S.C. 154(b) by 0 days.

(21) Appl. No.: 13/507,128

(22) Filed: Jun. 6, 2012

Related U.S. Application Data

(63) Continuation-in-part of application No. 13/068,078, filed on May 2, 2011.

(60) Provisional application No. 61/330,521, filed on May 3, 2010.

(51) Int. Cl.
*G01C 9/24* (2006.01)
*B43L 7/00* (2006.01)

(52) U.S. Cl. .............................. 33/613; 33/645; 33/451

(58) Field of Classification Search .................... 33/613, 33/645, 371, 379, 451
See application file for complete search history.

(56) References Cited

U.S. PATENT DOCUMENTS

| | | | | | |
|---|---|---|---|---|---|
| 4,813,149 | A | * | 3/1989 | Herkimer | 33/462 |
| 4,981,400 | A | * | 1/1991 | Stover | 33/679 |
| 5,647,139 | A | * | 7/1997 | Richardson | 33/608 |
| 6,047,478 | A | * | 4/2000 | Sowers | 33/379 |
| 6,148,529 | A | * | 11/2000 | Kennedy | 33/374 |
| 6,421,928 | B1 | * | 7/2002 | Miller | 33/520 |
| 6,430,827 | B2 | * | 8/2002 | Ruther | 33/451 |
| 6,907,671 | B2 | * | 6/2005 | Conner | 33/485 |
| 7,210,243 | B2 | * | 5/2007 | Schmidt et al. | 33/613 |
| 7,509,752 | B2 | * | 3/2009 | Schmidt et al. | 33/613 |
| 7,513,056 | B1 | * | 4/2009 | Hobden et al. | 33/451 |
| 7,814,675 | B2 | * | 10/2010 | Venderley et al. | 33/613 |
| 2001/0013176 | A1 | * | 8/2001 | Ruther | 33/451 |
| 2002/0078583 | A1 | * | 6/2002 | Richardson | 33/613 |
| 2002/0166249 | A1 | * | 11/2002 | Liao | 33/451 |
| 2002/0189119 | A1 | * | 12/2002 | High | 33/613 |
| 2006/0101661 | A1 | * | 5/2006 | Schmidt et al. | 33/613 |
| 2006/0174504 | A1 | * | 8/2006 | Szumer et al. | 33/613 |
| 2008/0134535 | A1 | * | 6/2008 | Webb | 33/645 |

* cited by examiner

*Primary Examiner* — Yaritza Guadalupe-McCall
(74) *Attorney, Agent, or Firm* — Mathew R. P. Perrone, Jr.

(57) ABSTRACT

A screw mount placement device uses a gear assembly mounted in a housing to allow an item to be hung levelly and further allow the item to be hung in a desired position relative to at least one other already mounted object.

20 Claims, 3 Drawing Sheets

SCREW MOUNT PLACEMENT DEVICE

CROSS REFERENCE TO RELATED APPLICATIONS

This application is a continuation in part of, and claims the benefit of priority, to U.S. Provisional Patent Application Ser. No. 61/330,521, filed May 3, 2010, filed by the same inventive entity. This application is also a continuation in part of, and claims the benefit of priority, to U.S. patent application Ser. No. 13/068,078, filed May 2, 2011, filed by the same inventive entity. Both of these applications are incorporated herein by reference.

This invention relates to a device for the proper mounting, hanging or leveling of shelves, pictures, and other items and more particularly to a mounting, hanging or leveling device where the item must be positioned in a level manner either for appearances or functionality and aesthetics, especially in reference to an item to be hung or mounted on a wall.

BACKGROUND OF THE INVENTION

Typically, it is a difficult task for an individual to position a picture, shelf, or other hanging decorator or functional item that requires a level placement by themselves using two mounting holes. Holding the item (such as a picture or shelf) or a traditional level; marking the spots to place the desired wall mounting fasteners, and then actually mounting the picture in a desired level position, can waste time and be a painstaking task.

Furthermore, the individual is many times forced to make several attempts to get the desired hanging object at the proper level or height or to achieve the correct spacing of the mounting apertures. In their efforts to do so, they often mark the walls with a marking device, using a trial and error method, thus creating another job to touch up with paint.

In addition to the above, it is often difficult to gain proper visual perspective in hanging new art work with in relation to other existing wall mounted pieces. Often people must lean back to get a better perspective and, in doing so, might lose their balance and fall. This can be critical if that person is using a taller ladder. An invention that can avoid that leaning back, also can be used safely on a ladder for hanging artwork or other wall items is a useful invention.

It is very desirable for individuals; such as art gallery curators, artists, and even homeowners who work with art, shelves, and mounted wall décor; to have such a device that will aid them in quickly, safely, and efficiently mounting the objects in the desired level manner without the need for several tools such as a tape measure, level, pencil and so forth.

SUMMARY OF THE INVENTION

Among the many objectives of the present invention is the provision of a screw mount placement device which can quickly create level marks for hanging and positioning wall mounted items that require two or more mounting screws. A further objective of the invention is the provision of a screw mount placement device which can be handled efficiently by an individual scaling a ladder.

A still further objective of the present invention is the provision of a screw mount placement device which can align newly mounted items with those already mounted on the wall.

Another objective of the present invention is the provision of a screw mount placement device which aids in securing a level position on or against the wall.

Yet another objective of the present invention is the provision of a screw mount placement device is the screw placement guides which allows for the accurate placement of screws based on the measurements of the item to be mounted.

Another objective to the present invention is the provision of a screw mount placement device which allows the user to calculate how their object is to be mounted.

Yet another objective of the present invention is the provision of a screw mount placement device which aids the user in checking the efficiency of proper vertical alignment.

Moreover, a further objective of the present invention is the provision of a screw mount placement device which allows the user to readily locate the center between the two mounting apertures.

These and other objectives of the invention (which other objectives become clear by consideration of the specification, claims and drawings as a whole) are met by providing a screw mount placement device which uses a gear assembly mounted in a housing to allow an item to be hung levelly and further allow the item to be hung in a desired position relative to at least one other already mounted object.

BRIEF DESCRIPTION OF THE DRAWINGS

Throughout the figures of the drawings, where the same part appears in more than one figure of the drawings, the same number is applied thereto.

DESCRIPTION OF THE PREFERRED EMBODIMENTS

Figure 1:
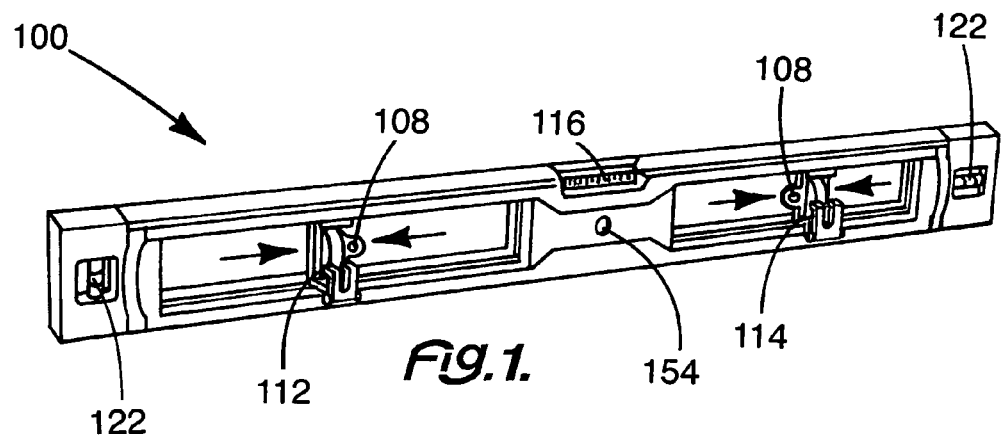
FIG. 1 depicts a front, perspective view for screw mount placement device 100 of this invention.

Reference will now be made in detail to several embodiments of the invention that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, down, over, above, below, beneath, rear, and front, may be used with respect to the drawings. These and similar to directional terms are not to be construed to limit the scope of the invention in any manner. The words attach, connect, couple, and similar terms with their inflectional morphemes do not necessarily denote direct or intermediate connections, but may also include connections through mediate elements or devices.

The screw mount placement device of this invention is very suitable for mounting, hanging or leveling a picture or other item on a wall or similar surface. The structure of the screw mount placement device permits accurate placement of whatever hanging item is being used or mounted. To that end, the adjustability of the screw mount placement device offers many great advantages. To that end, the gear assembly is used within the housing for the screw mount placement device in order to provide greater and more efficient adjustability. A centering aperture permits accurate placement of a hanging device, especially when used with the holding assemblies.

Figure 2:
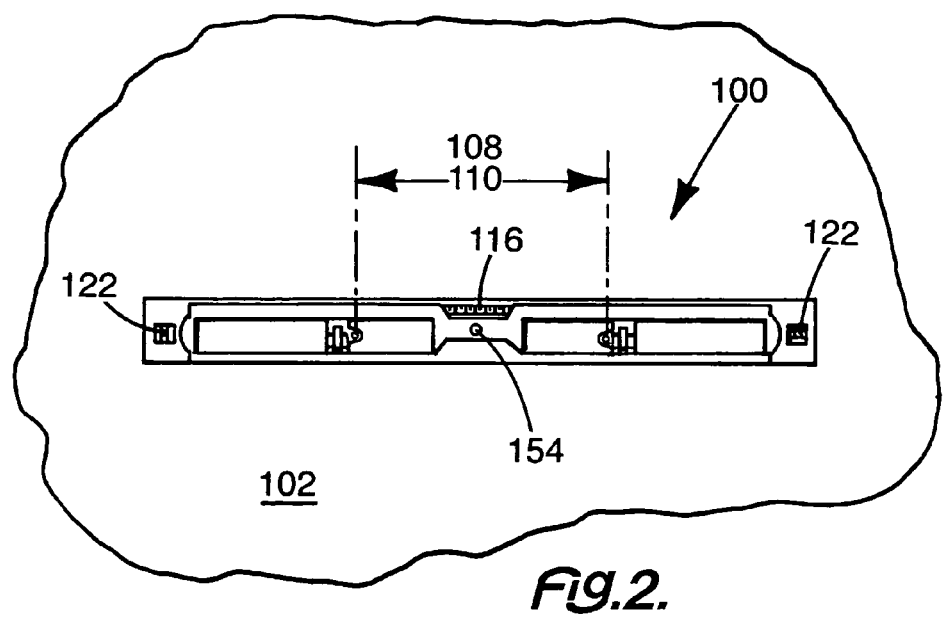
FIG. 2 depicts a front, plan view of screw mount placement device 100 in use.

Now referring to FIG. 1 and FIG. 2, the structure and function of screw mount placement device 100 can be seen. Screw mount placement device 100 is placed next to wall 102. Housing 106 for screw mount placement device 100 has a screw placement guide 108 in each of left slide 112 and right slide 114. Also within left slide 112 and right slide 114, is a screw aperture 110. Left slide 112 and right slide 114 are slidably mounted in opposite ends or sides of housing 106.

Further, centrally located in housing 106 between left slide 112 and right slide 114, is placement spacing measure 116. Adjacent to or close to each end of housing 106 is a level 122. Each level 122 combines to show when screw mount placement device 100 and housing 106 are positioned properly, to support the hanging of an appropriate item.

Figure 3:
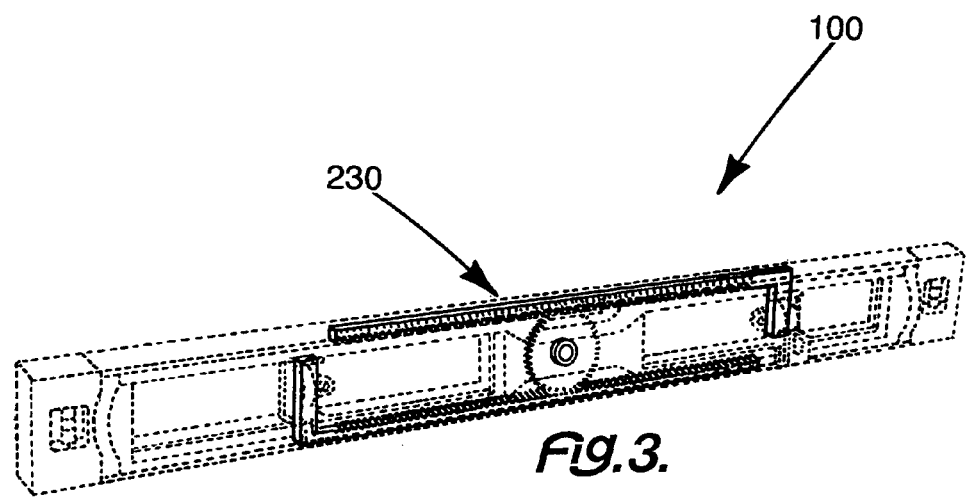
FIG. 3 depicts a perspective view of screw mount placement device 100 showing gear assembly 230.
Figure 4:
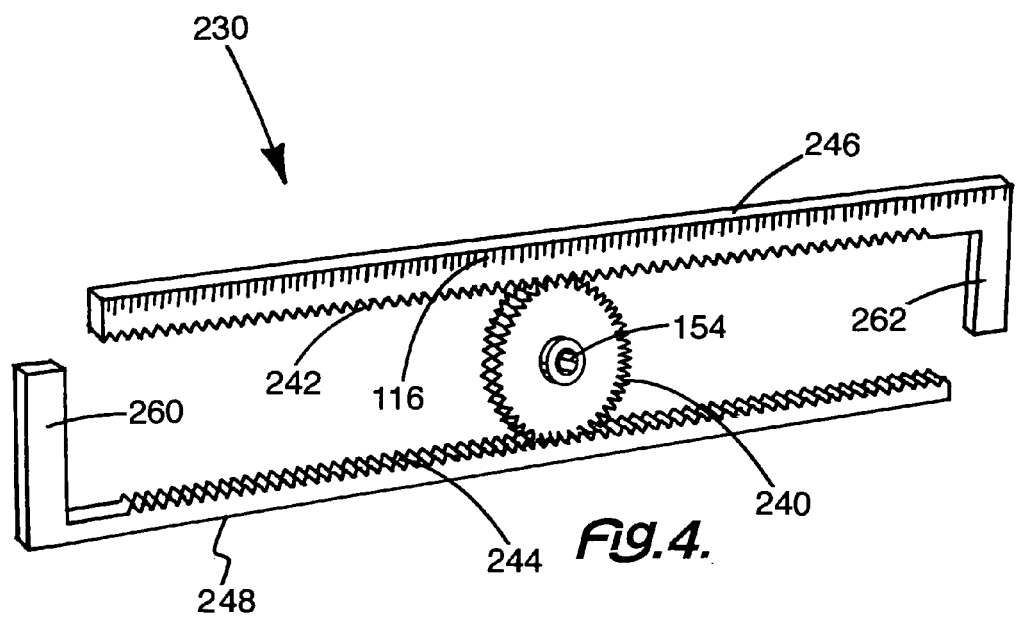
FIG. 4 depicts gear assembly 230, isolated from screw mount placement device 100.

Adding FIG. 3 and FIG. 4 to the consideration, the gear assembly 234 for operating the left slide 112 and the right slide 114 of screw mount placement device 100 can be seen. Gear assembly 234 includes a central circular gear 240. In contact with central circular gear 240 are top rack gear 242 on top rack 246 and bottom rack gear 244 on bottom rack 248. Bottom rack gear 244 contacts a bottom portion of central circular gear 240, while top rack gear 242 contacts the top portion of central circular gear 240. In other, the teeth of top rack gear 242 and the bottom rack gear 244 mesh with opposing sides of the circular gear 240 at the teeth thereof, thereby permitting the screw mount placement device 100 to operate in combination with its other parts.

Bottom rack 248 has left arm 260 at the end of bottom rack gear 244 to form an L-shape therewith. Left arm 260 fits with left sliding holder 136 of the left slide 112. Top rack 246 has right arm 262 at the end of top rack gear 242 to form an L-shape therewith. Right arm 262 fits with right sliding holder 138 of the right slide 114. Such structure permits screw mount placement device 100 to be easily adjusted for mounting desired material.

Figure 5:
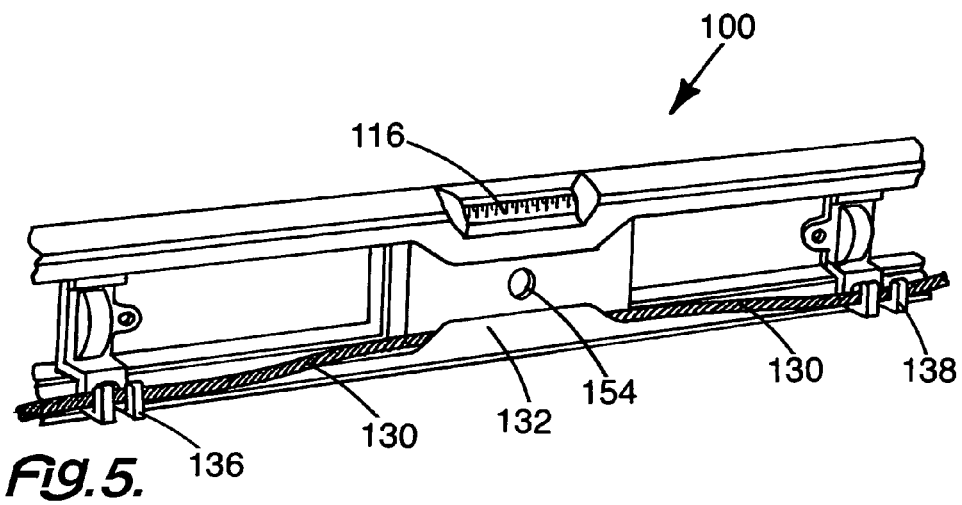
FIG. 5 depicts a front, perspective view of screw mount placement device 100 positioning cable 300 and desired slide assembly 222 of screw mount placement device 100.
Figure 6:
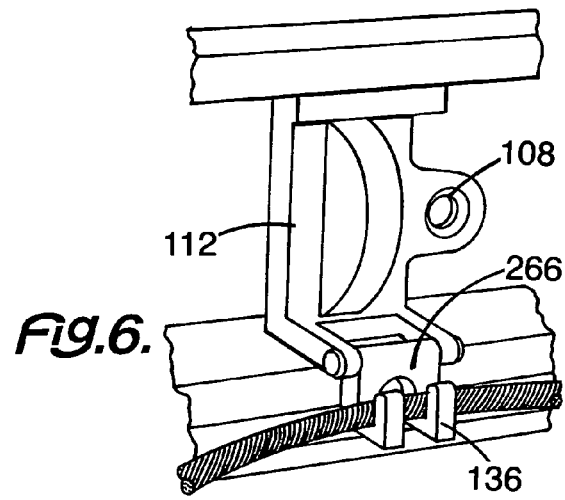
FIG. 6 depicts a perspective view of slide assembly 112 of screw mount placement device 100 showing cable sling 260 in a down position.
Figure 7:
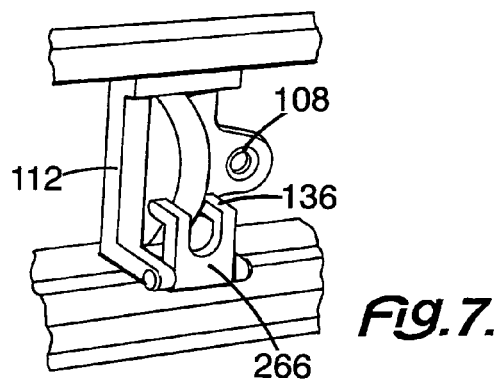
FIG. 7 depicts a perspective view of slide assembly 112 of screw mount placement device 100 showing cable sling 260 in an up position.

Adding FIG. 5, FIG. 6 and FIG. 7 to the consideration, use of the screw mount placement device 100 is illustrated. A cable 130 is positioned as desired within base cable holder 132 situated below center aperture 154 of housing 106. Base cable holder 132 is a U-shaped member adapted to hold cable 130. Cable 130 extends in two directions in order to contact both left slide 112 and right slide 114.

Left slide 112 includes left sliding holder 136, while right slide 114 includes left sliding holder 136 both extending into cable sling 266. FIG. 6 shows cable sling 266 in downward position 272, permitting movement of cable 130 as desired. In FIG. 7, left slide 112 has left sliding holder 136 raised to upward position 270 with cable sling 266 restricting movement of cable 130 as desired. Right slide 114 also has right sliding holder 138 raised to upward position 270 and extending to cable sling 266.

Also, screw mount placement device 100 has center aperture 116. Center aperture 116 is always directly in the center of each of the screw placement guides 108. This allows the item being mounted to be directly centered over a lower hung object or an existing object on the ground. For example, center aperture 116 can be used to levelly center a mirror over a sink or other desired position.

This application, taken as a whole with the abstract, specification, claims, and drawings, provides sufficient information for a person having ordinary skill in the art to practice the invention disclosed and claimed herein. Any measures necessary to practice this invention are well within the skill of a person having ordinary skill in this art after that person has made a careful study of this disclosure.

Because of this disclosure and solely because of this disclosure, modification of this tool can become clear to a person having ordinary skill in this particular art. Such modifications are clearly covered by this disclosure.

What is claimed and sought to be protected by Letters Patent is:

1. A screw mount placement device for mounting an item in a desired position comprising:
    a) a gear assembly being mounted in a housing to allow an item to be hung in a desired position;
    b) the housing having a left slide and a right slide slidably mounted in the housing;
    c) the left slide having a left placement guide;
    d) the right slide having a right placement guide;
    e) the left slide and the right slide being slidably mounted in opposite ends of the housing;
    f) a placement spacing measure being positioned in the housing between the left slide and the right slide; and
    g) the left slide and the right slide being connected to a gear assembly in the housing to facilitate use of the screw mount placement device.

2. The screw mount placement device of claim 1, further comprising:
    a) the placement spacing measure being centrally positioned in the housing;
    b) a first level being positioned in the housing near the first slide; and
    c) a second level being positioned in the housing near the second slide.

3. The screw mount placement device of claim 2, further comprising:
    a) the first slide being positioned in the housing between the placement spacing measure and the first level;
    b) the second slide being positioned in the housing between the placement spacing measure and the second level; and
    c) the first slide and the second slide being connected to the gear assembly.

4. The screw mount placement device of claim 3, further comprising:
    a) a left screw placement guide being in the left slide;
    b) a right screw placement guide being in the right slide; and
    d) the second level and the first level combining to show when the screw mount placement device and the housing are positioned properly.

5. The screw mount placement device of claim 4, further comprising:
    a) the first slide including a first screw aperture;
    b) the second slide including a second screw aperture;
    c) the gear assembly operating the left slide and the right slide;
    d) the gear assembly including a central circular gear; and
    e) the central circular gear being in contact with a top rack gear and a bottom rack gear.

6. The screw mount placement device of claim 5, further comprising:
    a) the bottom rack gear contacting a bottom portion of the central circular gear; and
    b) the top rack gear contacting a top portion of the central circular gear.

7. The screw mount placement device of claim 6, further comprising:

a) a bottom rack including a left arm and the bottom rack gear to form an L-shape therewith;
b) the left slide including a left sliding holder;
c) the left arm fitting with the left sliding holder;
d) a top rack including a right arm and the bottom rack gear to form an L-shape therewith;
e) the right slide including a right sliding holder; and
f) the right arm fitting with the right sliding holder.

8. The screw mount placement device of claim 7, further comprising:
a) a cable being positioned on the screw mount placement device;
b) the screw mount placement device including a base cable holder to receive the cable; and
g) the screw mount placement device including a base cable holder below the placement spacing measure.

9. The screw mount placement device of claim 8, further comprising:
a) the base cable holder being a U-shaped member adapted to hold the cable;
b) the cable extending in two directions in order to contact both the left slide and the right slide;
c) the cable holder including a cable sling;
d) the cable sling being movable between an upward position and downward position;
e) the upward position restricting movement of the cable; and
f) the downward position permitting movement of the cable.

10. The screw mount placement device of claim 9, further comprising:
a) a center aperture substantially centrally located therein; and
b) the center aperture being in a center and in between the left screw placement guide and the right screw placement guide.

11. A screw mount placement device for mounting an item in a desired position comprising:
a) a gear assembly being mounted in a housing to allow an item to be hung in a desired position;
b) the desired position being on a surface;
c) the housing having a left slide and a right slide slidably mounted in the housing;
d) the left slide having a left placement guide;
e) the right slide having a right placement guide;
f) the left slide and the right slide being slidably mounted in opposite ends of the housing;
g) a placement spacing measure being positioned in the housing between the left slide and the right slide; and
h) the left slide and the right slide being connected to a gear assembly in the housing to facilitate use of the screw mount placement device.

12. The screw mount placement device of claim 11, further comprising:
a) the placement spacing measure being centrally positioned in the housing;
b) a first level being positioned in the housing near the first slide; and
c) a second level being positioned in the housing near the second slide.

13. The screw mount placement device of claim 12, further comprising:
a) the first slide being positioned in the housing between the placement spacing measure and the first level;
b) the second slide being positioned in the housing between the placement spacing measure and the second level; and
c) the first slide and the second slide being connected to the gear assembly.

14. The screw mount placement device of claim 13, further comprising:
a) a left screw placement guide being in the left slide;
b) a right screw placement guide being in the right slide; and
c) the second level and the first level combining to show when the screw mount placement device and the housing are positioned properly.

15. The screw mount placement device of claim 14, further comprising:
a) the first slide including a first screw aperture;
b) the second slide including a second screw aperture;
c) the gear assembly operating the left slide and the right slide;
d) the gear assembly including a central circular gear; and
e) the central circular gear being in contact with a top rack gear and a bottom rack gear.

16. The screw mount placement device of claim 15, further comprising:
a) the bottom rack gear contacting a bottom portion of the central circular gear; and
b) the top rack gear contacting a top portion of the central circular gear.

17. The screw mount placement device of claim 16, further comprising:
a) a bottom rack including a left arm and the bottom rack gear to form an L-shape therewith;
b) the left slide including a left sliding holder;
c) the left arm fitting with the left sliding holder;
d) a top rack including a right arm and the bottom rack gear to form an L-shape therewith;
e) the right slide including a right sliding holder; and
f) the right arm fitting with the right sliding holder.

18. The screw mount placement device of claim 17, further comprising:
a) a cable being positioned on the screw mount placement device;
b) the screw mount placement device including a base cable holder to receive the cable; and
c) the screw mount placement device including a base cable holder below the placement spacing measure.

19. The screw mount placement device of claim 18, further comprising:
a) the base cable holder being a U-shaped member adapted to hold the cable;
b) the cable extending in two directions in order to contact both the left slide and the right slide;
c) the cable holder including a cable sling;
d) the cable sling being movable between an upward position and a downward position;
e) the upward position restricting movement of the cable; and
f) the downward position permitting movement of the cable.

20. The screw mount placement device of claim 19, further comprising:
a) a center aperture substantially centrally located therein; and
b) the center aperture being in a center and in between the left screw placement guide and the right screw placement guide.

* * * * *